US007234041B2

United States Patent
Lin (10) Patent No.: US 7,234,041 B2
(45) Date of Patent: Jun. 19, 2007

(54) EMBEDDED SYSTEM WITH INSTRUCTION PREFETCHING DEVICE, AND METHOD FOR FETCHING INSTRUCTIONS IN EMBEDDED SYSTEMS

(75) Inventor: Chang-Fu Lin, Hsinchu (TW)

(73) Assignee: Mediatek Inc., HsinChu Hsien (TW)

( * ) Notice: Subject to any disclaimer, the term of this patent is extended or adjusted under 35 U.S.C. 154(b) by 409 days.

(21) Appl. No.: 10/458,470

(22) Filed: Jun. 10, 2003

(65) Prior Publication Data

US 2003/0233531 A1    Dec. 18, 2003

(30) Foreign Application Priority Data

Jun. 12, 2002   (TW)  ............................... 91112826 A (51) Int. Cl.
*G06F 12/00* (2006.01)
(52) U.S. Cl. .................................... 712/207
(58) Field of Classification Search ................ 712/207, 712/206, 225; 710/108, 109
See application file for complete search history.

(56) References Cited

U.S. PATENT DOCUMENTS

| 5,490,113 | A | * | 2/1996 | Tatosian et al. | ....... | 365/189.05 |
| 5,778,422 | A | | 7/1998 | Genduso et al. | ............ | 711/117 |
| 5,805,844 | A | * | 9/1998 | Gustin et al. | ................ | 710/309 |
| 5,835,947 | A | * | 11/1998 | Cherabuddi | .................. | 711/125 |
| 5,893,921 | A | * | 4/1999 | Bucher et al. | .............. | 711/146 |
| 5,920,891 | A | * | 7/1999 | Steinbach et al. | .......... | 711/146 |
| 5,924,119 | A | * | 7/1999 | Sindhu et al. | .............. | 711/141 |
| 5,991,855 | A | * | 11/1999 | Jeddeloh et al. | ............ | 711/146 |
| 5,996,071 | A | * | 11/1999 | White et al. | ................ | 712/238 |
| 6,047,359 | A | | 4/2000 | Fouts | .......................... | 711/137 |
| 6,163,835 | A | * | 12/2000 | Todd et al. | .................... | 712/34 |
| 6,275,885 | B1 | * | 8/2001 | Chin et al. | .................. | 710/311 |
| 6,314,472 | B1 | * | 11/2001 | Trieu et al. | .................... | 710/5 |
| 6,341,334 | B1 | * | 1/2002 | Kamemaru | ................. | 711/137 |
| 6,542,982 | B2 | * | 4/2003 | Murakami et al. | .......... | 712/207 |
| 6,895,456 | B2 | * | 5/2005 | Olarig et al. | ............... | 710/100 |
| 6,963,954 | B1 | * | 11/2005 | Trehus et al. | ................ | 711/137 |

* cited by examiner

*Primary Examiner*—Eric Coleman
(74) *Attorney, Agent, or Firm*—Winston Hsu (57) ABSTRACT

In a method for fetching instructions in an embedded system, a predicted one of a set of the instructions stored in a memory device is fetched and is subsequently stored in an instruction buffer when a system bus is in a data access phase. When a processor generates an access request for the memory device, the predicted one of the instructions stored in the instruction buffer is provided to the system bus for receipt by the processor upon determining that the predicted one of the instructions stored in the instruction buffer hits the access request from the processor. An embedded system with an instruction prefetch device is also disclosed.

7 Claims, 5 Drawing Sheets

EMBEDDED SYSTEM WITH INSTRUCTION
PREFETCHING DEVICE, AND METHOD
FOR FETCHING INSTRUCTIONS IN
EMBEDDED SYSTEMS

CROSS-REFERENCE TO RELATED
APPLICATION

This application claims priority of Taiwanese Application No. 091112826, filed on Jun. 12, 2002.

BACKGROUND OF THE INVENTION

1. Field of the Invention

The invention relates to an embedded system, more particularly to an embedded system with an instruction prefetch device and to a method for fetching instructions in embedded systems.

2. Description of the Related Art

Figure 1:
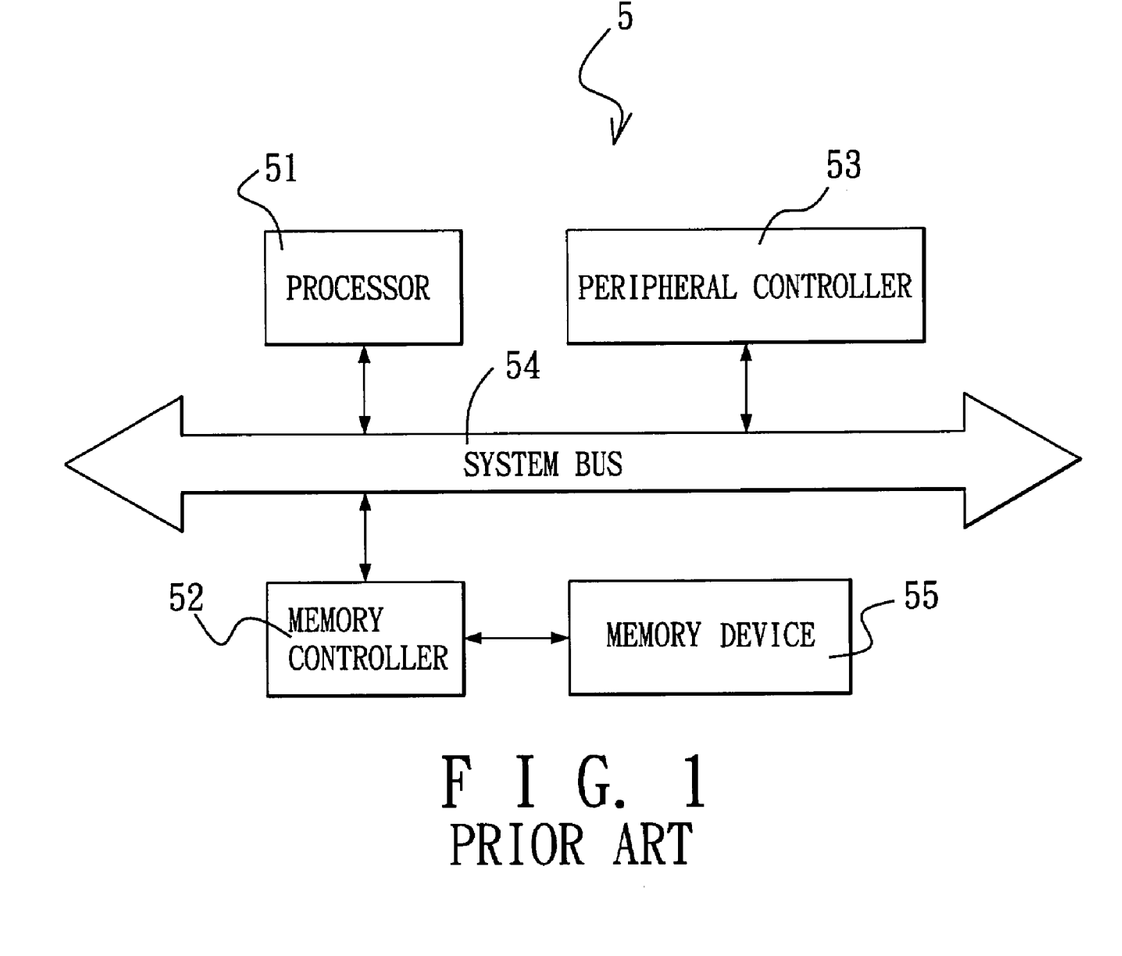
FIG. 1 is a schematic circuit block diagram illustrating a conventional embedded system.

FIG. 1 illustrates a conventional embedded system 5 that includes a system bus 54, a processor 51 coupled to the system bus 54, a memory controller 52 coupled to the system bus 54, a peripheral controller 53 coupled to the system bus 54, and a memory device 55 coupled to the memory controller 52. The peripheral controller 53 may be various controllers or drivers coupled to the system bus 54 and can be controlled by the processor 51. For example, in a cellular phone applications, the peripheral controller 53 may be a controller to control the LCD or keypad of a cellular phone. When the processor 51 generates an access request for the memory device 55, the memory controller 52 fetches an instruction corresponding to the access request from the processor 51 from the memory device 55, and provides the instruction to the system bus 54 for receipt by the processor 51.

Although the conventional embedded system has a lower system performance, it works well in various applications. However, as the embedded system 5 becomes more complex, the embedded system 5 is required to run at higher speeds to achieve better performance. More particularly, access latency occurs during fetching of an instruction from the memory device 55 after the processor 51 sent out an access request (i.e., fetching cycle), so the performance of the processor 51 is degraded. For the conventional embedded system, the fetching cycle occupies approximately 30%~50% of the instruction cycle of the processor 51, so access latency is a problem which cannot be ignored.

Two methods are proposed in the art in order to overcome the above problem.

1. An additional cache memory (L2 cache) is incorporated to enhance the embedded system performance. However, the cache memory (such as an SRAM) has a higher cost and a relatively small memory capacity.

Figure 2:
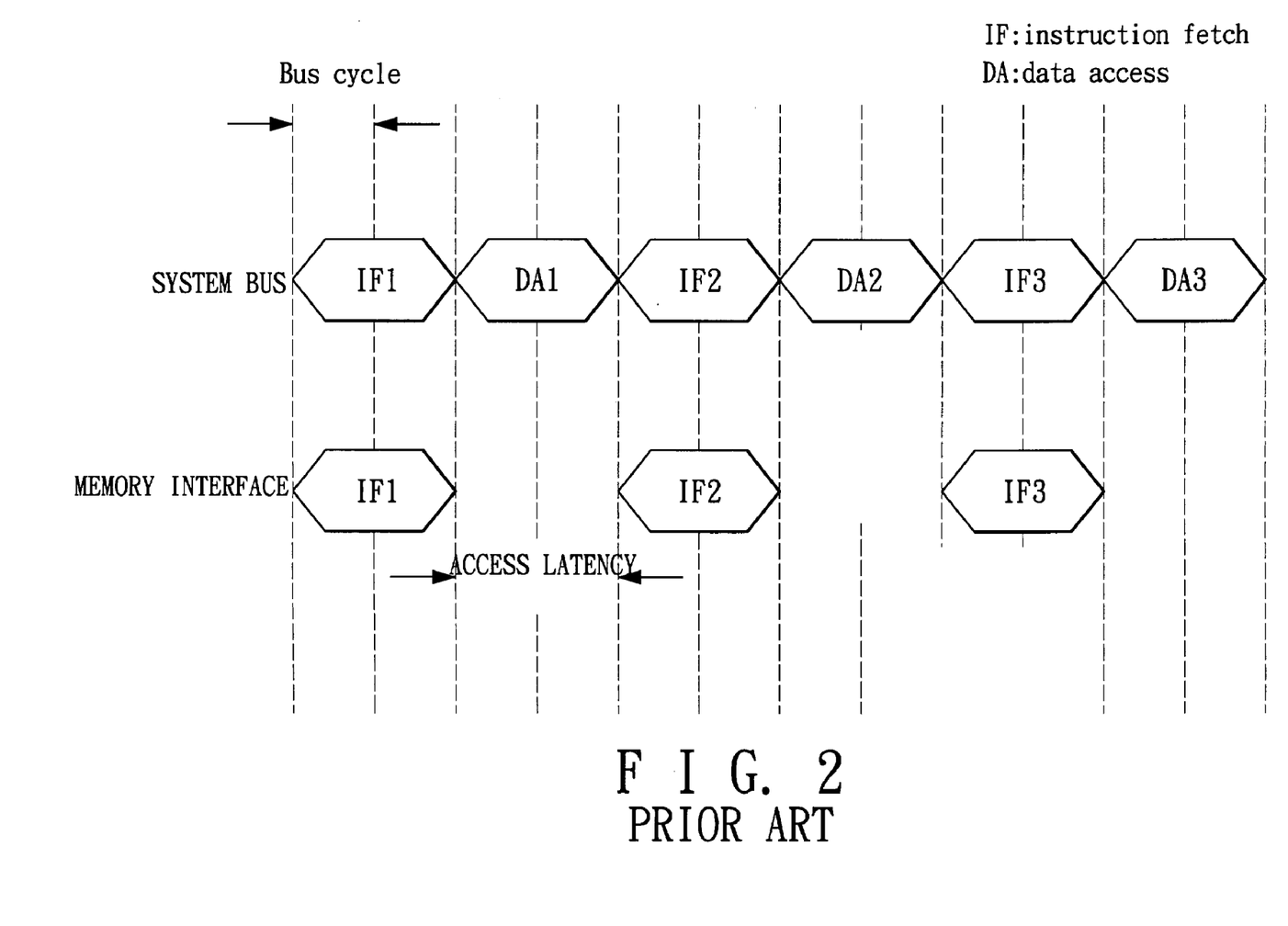
FIG. 2 is a timing chart showing an operating example of a system bus and a memory interface in the conventional embedded system.

2. When the processor 51 executes an instruction, fetching of a next instruction is executed at the same time. However, when the next instruction is among a series of consecutive instructions or has too many branch instructions, data access to or from the peripheral controller 53 must wait until fetching of the next instruction has been completed by the processor 51. FIG. 2 is a timing chart to illustrate an operating example of the conventional embedded system 5. The system bus 54 is occupied by the instruction fetch phase and the data access phase in turns. In the instruction phase, the processor 51 communicates with the memory device 55 and fetches instructions or data stored in the memory device 55; whereas in the data access phase, the processor 51 communicates with the peripheral controller 53 and requests the peripheral controller 53 to perform certain actions. As such, when the system bus 54 is in the data access phase, the memory controller 52 remains idle for a period of time (about two bus cycles) until the data access phase is completed.

SUMMARY OF THE INVENTION

Therefore, the object of the present invention is to provide an embedded system with an instruction prefetch device and a method for fetching instructions in embedded systems that can effectively reduce access latency and improve utilization of a system bus at a relatively low cost.

According to one aspect of the present invention, there is provided a method for fetching instructions in an embedded system that includes a system bus, a processor coupled to the system bus, a peripheral controller coupled to the system bus, and a memory device having a set of the instructions stored therein. The method comprises the steps of:

a) determining whether the system bus is in the data access phase;

b) fetching a predicted one of the instructions from the memory device, and storing the predicted one of the instructions in an instruction buffer when the system bus is in the data access phase;

c) determining whether the processor generates an access request for the memory device;

d) determining whether the predicted one of the instructions stored in the instruction buffer hits the access request from the processor upon determining that the processor generated the access request; and e) providing the predicted one of the instructions stored in the instruction buffer to the system bus for receipt by the processor when the predicted one of the instructions stored in the instruction buffer hits the access request from the processor.

According to another aspect of the present invention, an embedded system comprises:

a system bus for signaling and data transactions;
a processor coupled to the system bus;
a peripheral controller coupled to the system bus;
a memory device having a set of instructions stored therein; and
an instruction prefetch device coupled to the system bus and the memory device, the instruction prefetch device monitoring signal transaction on the system bus and fetching a predicted one of the instructions from the memory device when the system bus is in the data access phase, the instruction prefetching device receiving an access request for the memory device from the processor through the system bus, and providing the predicted one of the instructions to the system bus for receipt by the processor when the predicted one of the instructions hits the access request from the processor.

According to still another aspect of the present invention, an instruction prefetch device is adapted for use in an embedded system that includes a system bus, a processor coupled to the system bus, a peripheral controller coupled to the system bus, and a memory device having a set of instructions stored therein. The instruction prefetch device comprises:

a prefetch controller coupled to the system bus and adapted to monitor transaction on the system bus;
a memory controller coupled to the prefetch controller and the memory device; and
an instruction buffer coupled to the prefetch controller and the memory controller;

the prefetch controller enabling the memory controller to fetch a predicted one of the instructions from the memory device and to store the predicted one of the instructions in the instruction buffer when the prefetch controller determines that the system bus is in the data access phase;

the prefetch controller being adapted to receive an access request for the memory device from the processor through the system bus when the system bus is not in the data access phase, and being adapted to provide the predicted one of the instructions stored in the instruction buffer to the processor through the system bus when the predicted one of the instructions stored in the instruction buffer hits the access request from the processor.

BRIEF DESCRIPTION OF THE DRAWINGS

Other features and advantages of the present invention will be come apparent in the following detailed description of the preferred embodiment with reference to the accompanying drawings, of which.

DETAILED DESCRIPTION OF THE PREFERRED EMBODIMENT

Figure 3:
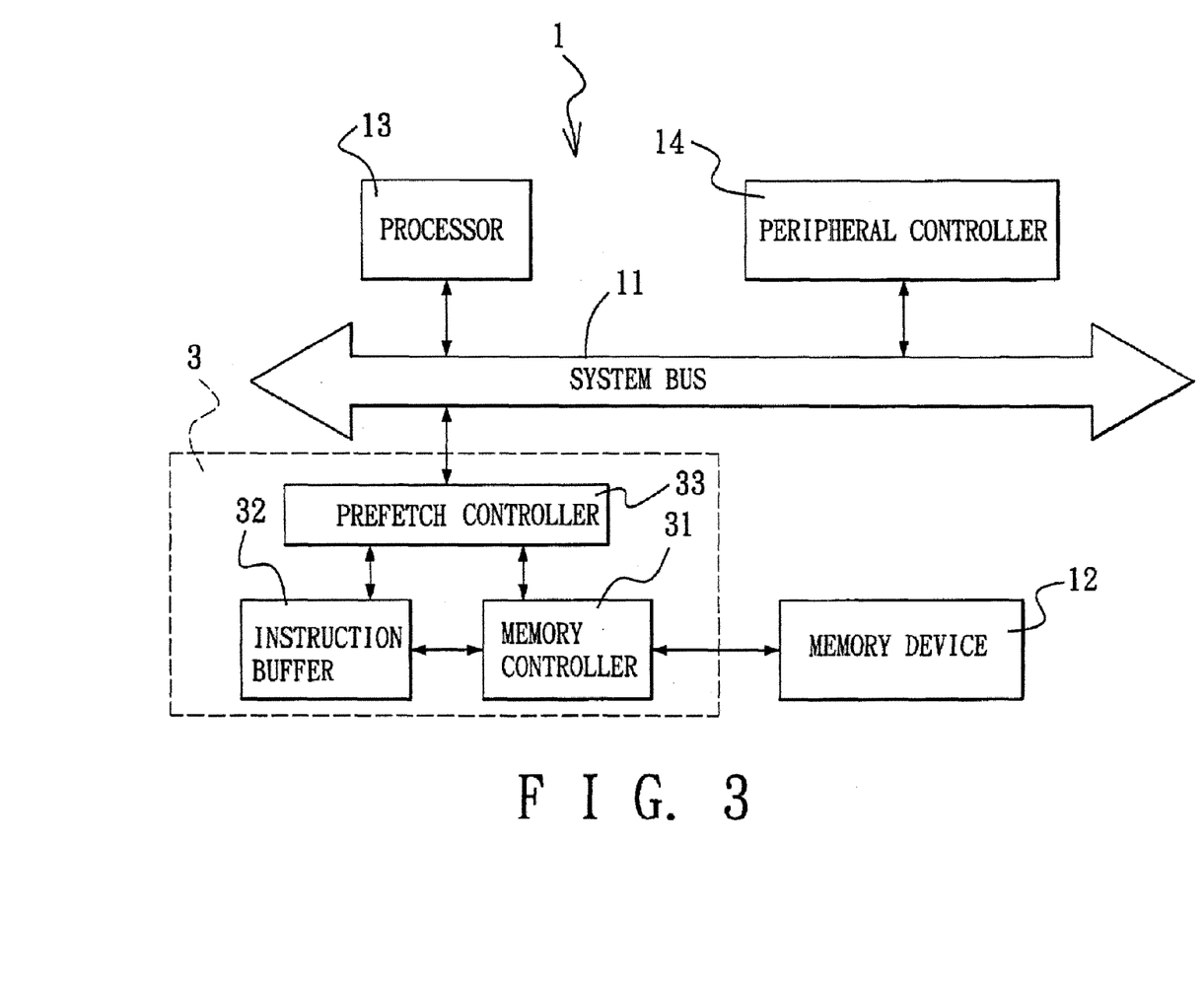
FIG. 3 is a schematic circuit block diagram illustrating the preferred embodiment of an embedded system according to the present invention.

Referring to FIG. 3, the preferred embodiment of an embedded system 1 according to the present invention is shown to include a system bus 11, a processor 13, a peripheral controller 14, a memory device 12, and an instruction prefetch device 3.

The system bus 11 is used for signaling and data transactions. As known to those skilled in the art, the system bus 11 may include an address bus, a control bus, and a data bus, etc.

The processor 13 is coupled to the system bus 11 for controlling communication and data transmission within the embedded system 1 or with other external devices (not shown).

The peripheral controller 14 is coupled to the system bus 11. In a cellular phone or other handheld systems, the peripheral controller 14 may be a controller to control a peripheral device, such as an LCD display, a keypad, an IR (intra-red) device, or a USB (Universal Serial Bus) device.

The memory device 12 has a set of instructions or data stored therein. In this embodiment, the memory device 12 may be an internal memory located inside the embedded system, or an external memory located outside the embedded system. The memory device 12 may be a ROM, FLASH, SRAM, DRAM or similar electronic devices for storing instructions of the processor 13.

The instruction prefetch device 3 is coupled to the system bus 11 and the memory device 12 and serves as an interface for transmission and control between the processor 13 and the memory device 12. The instruction prefetch device 3 monitors signal transaction on the system bus 11 and fetches a predicted one of the instructions from the memory device 12 when the system bus 11 is in the data access phase. The instruction prefetch device 3 receives an access request for the memory device 12 from the processor 13 through the system bus 11, and provides the predicted one of the instructions to the system bus 11 for receipt by the processor 13 when the predicted one of the instructions hits the access request from the processor 13.

In this embodiment, the instruction prefetch device 3 includes a prefetch controller 33 coupled to the system bus 11 for monitoring signal transaction on the system bus 11, a memory controller 31 coupled to the memory device 12 and the prefetch controller 33, and an instruction buffer 32 coupled to the prefetch controller 33 and the memory controller 31. The prefetch controller 33 enables the memory controller 31 to fetch a predicted one of the instructions from the memory device 12 and to store the predicted one of the instructions in the instruction buffer 32 when the prefetch controller 33 determines that the system bus 11 is in the data access phase. The prefetch controller 33 receives an access request from the processor 13 through the system bus 11 when the system bus 11 is in the instruction fetching phase, and provides a predicted one of the instructions stored in the instruction buffer 32 to the processor 13 through the system bus 11 when the predicted one of the instructions stored in the instruction buffer 32 hits the access request from the processor 13. It is noted that the predicted one of the instructions is determined by the prefetch controller 33 according to a previous instruction from the memory device 12 that was accessed by the processor 13.

Figure 4:
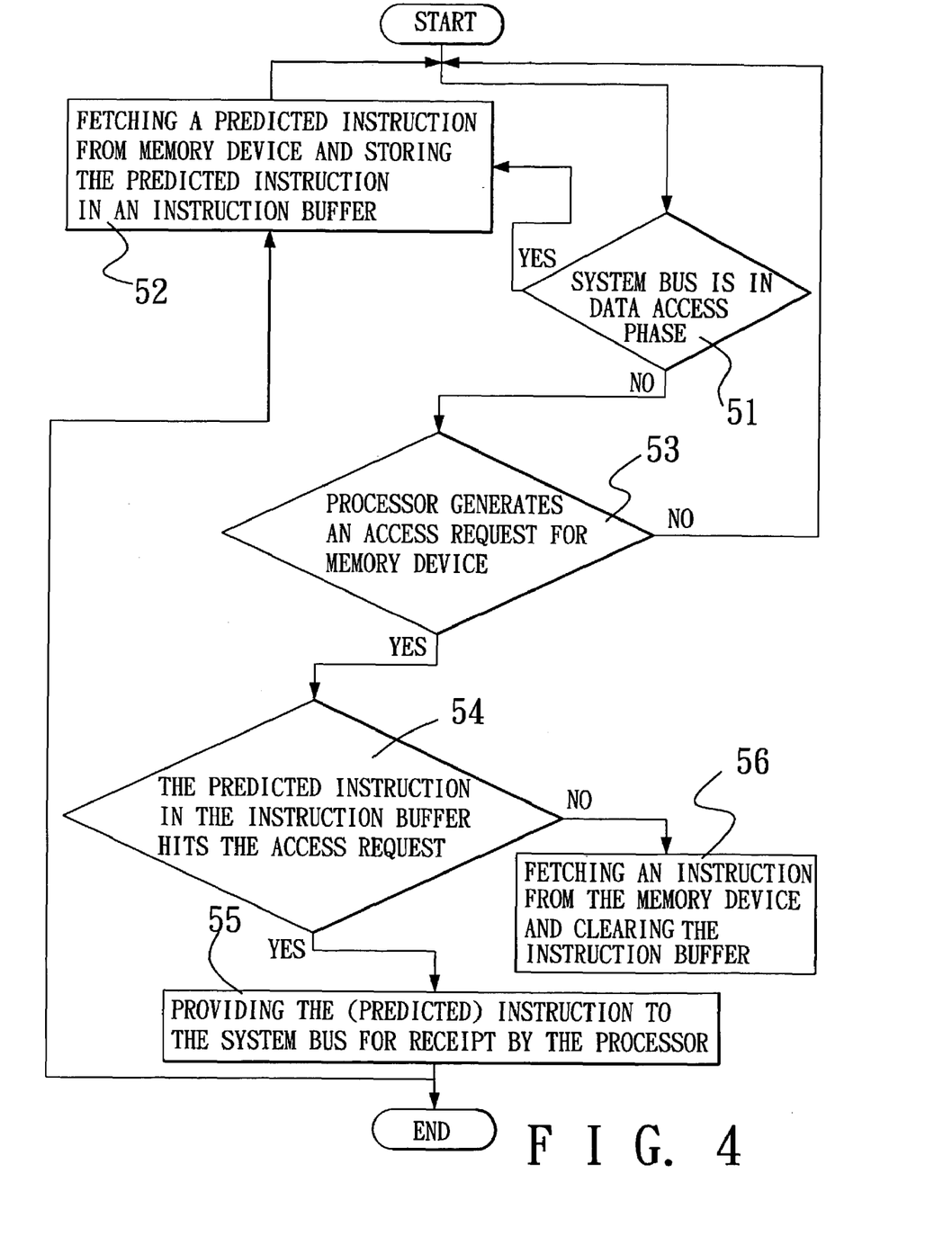
FIG. 4 is a flow chart illustrating a method for fetching instructions in the preferred embodiment.

Referring to FIG. 4, there is shown a flow chart to illustrate how the instruction prefetch device 3 fetches instructions in the embedded system 1 of the preferred embodiment. In step 51, when a transaction is started on the system bus 11, the prefetch controller 33 determines whether the system bus 11 is in the data access phase. In step 52, when the prefetch controller 33 determines that the system bus 11 is in the data access phase, the prefetch controller 33 enables the memory controller 31 to fetch a predicted one of the instructions from the memory device 12 and to store the predicted one of the instructions into the instruction buffer 32, and the flow proceeds back to step 51. In view of sequential characteristics of the instructions executed by the processor 13, the predicted one of the instructions is determined by the prefetch controller 33 according to previous instructions from the memory device 12 that were accessed by the processor 13. In step 53, the prefetch controller 33 determines whether the processor 13 generates an access request for the memory device 12. When the processor 13 does not generate an access request for the memory device 12, the flow proceeds back to step 51. In step 54, the prefetch controller 33 determines whether the predicted one of the instructions stored in the instruction buffer 32 hits the access request from the processor 13 when the prefetch controller 33 receives the access request from the processor 13. In step 55, the prefetch controller 33 provides the predicted one of the instructions stored in the instruction buffer 32 to the system bus 11 for receipt by the processor 13 when the predicted one of the instructions stored in the instruction buffer 32 hits the access request from the processor 13. On the other hand, in step 56, when the predicted one of the instructions stored in the instruction buffer 32 misses the access request from the processor 13, the prefetch controller 33 enables the memory controller 31 to fetch an instruction corresponding to the access request from the processor 13 from the memory device 12 according to an address signal from the processor 13, and clears the instruction buffer 32 so as to allow the instruction buffer 32 to store a next predicted one of the instructions stored in the memory device 12. The flow then proceeds to step 55 such that the prefetch controller 33 provides the proper instruction from the memory device 12 to the system bus 11 for receipt by the processor 13. It is noted that the instruction prefetch device 3 may include additional instruction buffers for storing more than one predicted instruction from the memory device 12 so as to reduce the number of buffer clearing operations.

Figure 5:
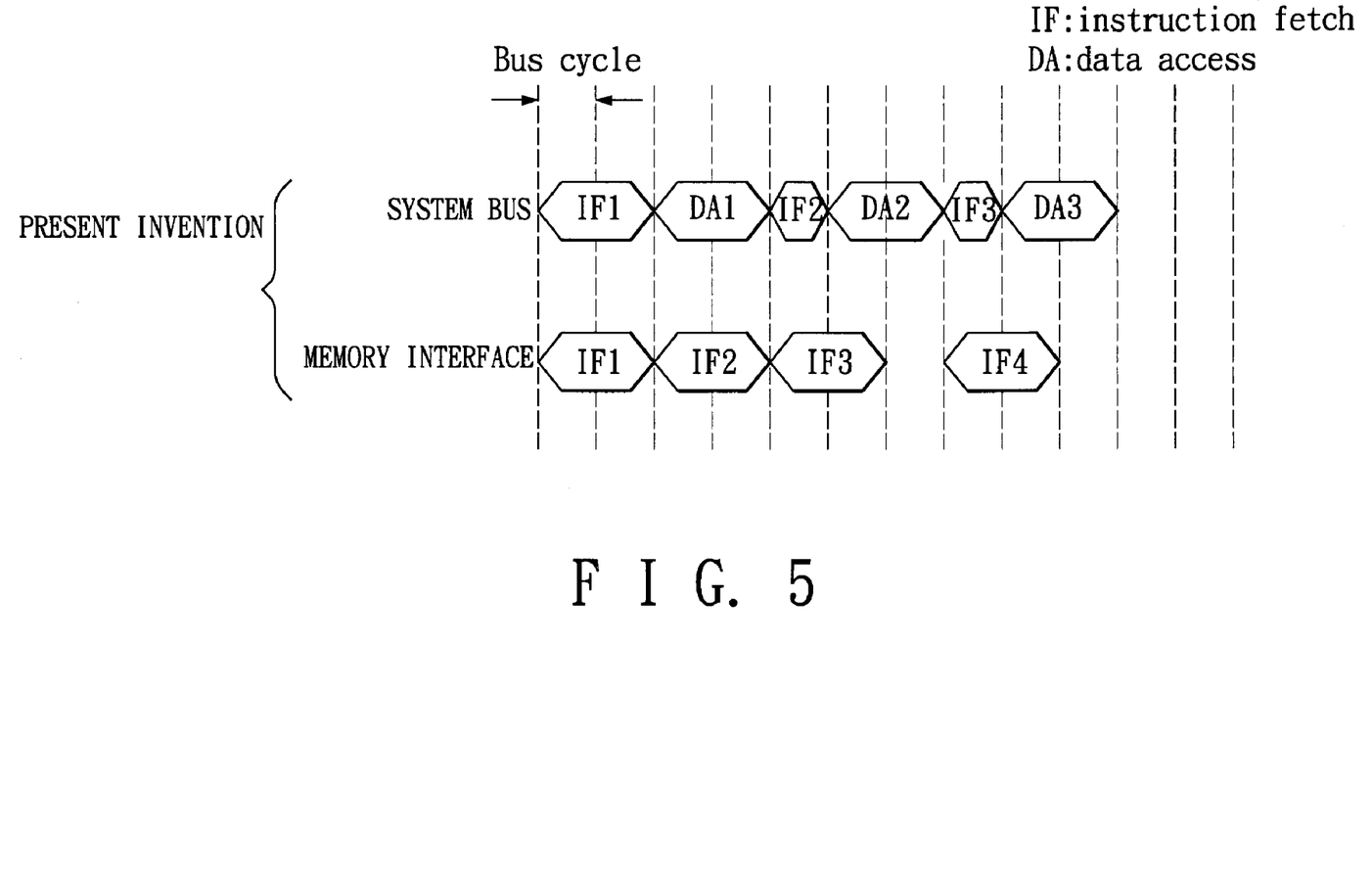
FIG. 5 is a timing chart showing an operating example of a system bus and a memory interface in the preferred embodiment.

Referring to FIG. 5, there is shown a timing chart of an operating example of the system bus 11 and a memory interface of the memory device 12. In this example, when the system bus 11 is in the data access phase (DA1), the prefetch controller 33 enables the memory controller 31 to fetch a predicted instruction (IF2) stored in the memory device 12 and to store the predicted instruction (IF2) in the instruction buffer 32 such that the prefetch controller 33 can provide the predicted instruction (IF2) stored in the instruction buffer 32 to the system bus 11 for receipt by the processor 13 upon receiving an access request of the predicted instruction (IF2) from the processor 13. Thus, only one bus cycle is needed for the processor 13 to fetch the predicted instruction (IF2) on the system bus 11. Meanwhile, when the predicted instruction (IF2) is sent to the processor 13 through the system bus 11, the prefetch controller 33 can perform prefetching of a next predicted instruction (IF3), simultaneously. Therefore, the efficiency of the system bus 11 can be improved, and the latency for fetching instructions by the processor 13 can be effectively shortened. For example, in the stage of data access (DA3), the embedded system 1 of the present invention has been advanced by about two bus cycles as compared to the timing chart of FIG. 2 for the aforesaid conventional embedded system.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A method for fetching instructions in an embedded system that includes a system bus, a processor coupled to the system bus, at least a peripheral controller coupled to the system bus, and a memory device having a set of the instructions stored therein, said method comprising the steps of:
   a) determining whether the system bus is in a data access phase, wherein in the data access phase, the system bus is occupied by data communication between the processor and the peripheral controller or between two peripheral controllers;
   b) fetching a predicted one of the instructions from the memory device and storing the predicted one of the instructions in an instruction buffer when the system bus is in the data access phase;
   c) determining whether the processor generates an access request for the memory device;
   d) determining whether the predicted one of the instructions stored in the instruction buffer hits the access request from the processor upon determining that the processor generated the access request; and
   e) providing the predicted one of the instructions stored in the instruction buffer to the system bus for receipt by the processor when the predicted one of the instructions stored in the instruction buffer hits the access request from the processor.

2. The method as claimed in claim 1, wherein, in step b), the predicted one of the instructions is determined according to a previous instruction from the memory device that was accessed by the processor.

3. An embedded system comprising:
   a system bus for signaling and data transactions;
   a processor coupled to said system bus;
   at least a peripheral controller coupled to said system bus;
   a memory device having a set of instructions stored therein; and
   an instruction prefetch device coupled to said system bus and said memory device, said instruction prefetch device monitoring transaction on said system bus and fetching a predicted one of the instructions from said memory device when said system bus is in a data access phase, said instruction prefetch device receiving an access request for said memory device from said processor through said system bus, and providing the predicted one of the instructions to said system bus for receipt by said processor when the predicted one of the instructions hits the access request from said processor, wherein in the data access phase, the system bus is occupied by data communication between the processor and the peripheral controller or between two peripheral controllers.

4. The embedded system as claimed in claim 3, wherein said instruction prefetch device includes a prefetch controller coupled to said system bus for monitoring transaction on said system bus, a memory controller coupled to said memory device and said prefetch controller, and an instruction buffer coupled to said prefetch controller and said memory controller, said prefetch controller enabling said memory controller to fetch the predicted one of the instructions from said memory device and to store the predicted one of the instructions in said instruction buffer when said prefetch controller determines that said system bus is in the data access phase, said prefetch controller receiving the access request from said processor through said system bus when said system bus is not in the data access phase, and providing the predicted one of the instructions stored in said instruction buffer to said processor through said system bus when the predicted one of the instructions stored in said instruction buffer hits the access request from said processor.

5. The embedded system as claimed in claim 4, wherein the predicted one of the instructions is determined by said prefetch controller according to a previous instruction from said memory device that was accessed by said processor.

6. An instruction prefetch device installed in an embedded system that includes a system bus, a processor coupled to the system bus, at least a peripheral controller coupled to the system bus, and a memory device having a set of instructions stored therein, said instruction prefetch device comprising:
   a prefetch controller, coupled to the system bus, capable of monitoring signal transaction on the system bus;
   a memory controller coupled to said prefetch controller and the memory device; and
   an instruction buffer coupled to said prefetch controller and said memory controller;
   said prefetch controller enabling said memory controller to fetch a predicted one of the instructions from the memory device and to store the predicted one of the instructions in said instruction buffer when said prefetch controller determines that the system bus is in a data access phase, wherein in the data access phase, the system bus is occupied by data communication between the processor and the peripheral controller or between two peripheral controllers;

said prefetch controller receives an access request for the memory device from the processor through the system bus when the system bus is not in the data access phase, and provides the predicted one of the instructions stored in said instruction buffer to the processor through the system bus when the predicted one of the instructions stored in said instruction buffer hits the access request from the processor.

7. The instruction prefetch device as claimed in claim 6, wherein the predicted one of the instructions is determined by said prefetch controller according to a previous instruction from the memory device that was accessed by the processor.

* * * * *

UNITED STATES PATENT AND TRADEMARK OFFICE
CERTIFICATE OF CORRECTION

| | |
|---|---|
| PATENT NO. | : 7,234,041 B2 |
| APPLICATION NO. | : 10/458470 |
| DATED | : June 19, 2007 |
| INVENTOR(S) | : Chang-Fu Lin |

It is certified that error appears in the above-identified patent and that said Letters Patent is hereby corrected as shown below:

On the title page, item (54), correct the invention title from "Embedded system with instruction prefetching device, and method for fetching instructions in embedded systems" to --"Embedded system with instruction prefetch device, and method for fetching instructions in embedded systems"--

Signed and Sealed this

Fourteenth Day of August, 2007

JON W. DUDAS
*Director of the United States Patent and Trademark Office*